United States Patent
Ohr et al.

(10) Patent No.: US 10,428,878 B2
(45) Date of Patent: Oct. 1, 2019

(54) WEDGE PLATE CLUTCH WITH DUAL FUNCTION SPRING

(71) Applicant: Schaeffler Technologies AG & Co. KG, Herzogenaurach (DE)

(72) Inventors: Carsten Ohr, Charlotte, NC (US); Ryan Carlino, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 122 days.

(21) Appl. No.: 15/889,469

(22) Filed: Feb. 6, 2018

(65) Prior Publication Data
US 2019/0242440 A1  Aug. 8, 2019

(51) Int. Cl.
*F16D 13/16* (2006.01)
*F16D 23/12* (2006.01)

(52) U.S. Cl.
CPC ............. *F16D 13/16* (2013.01); *F16D 23/12* (2013.01); *F16D 2023/123* (2013.01)

(58) Field of Classification Search
CPC ..... F16D 13/16; F16D 23/12; F16D 2023/123
See application file for complete search history.

(56) References Cited

U.S. PATENT DOCUMENTS

| | | | | |
|---|---|---|---|---|
| 285,940 | A | * | 10/1883 | Wels ........................ F16D 13/16 192/76 |
| 1,412,234 | A | * | 4/1922 | Fall ........................ F16D 13/16 192/75 |
| 1,469,564 | A | * | 10/1923 | Marotta .................. F16D 13/16 192/76 |
| 1,507,543 | A | * | 9/1924 | Barraja-Frauenfelder .................. F16D 13/16 192/76 |
| 1,767,387 | A | * | 6/1930 | McBride ................. F16D 13/16 192/76 |
| 2,278,556 | A | * | 4/1942 | Osterholm .............. F16D 13/16 192/76 |
| 2017/0198761 | A1 | * | 7/2017 | Ince ........................ F16D 13/16 |

* cited by examiner

*Primary Examiner* — Stacey A Fluhart

(57) ABSTRACT

A wedge plate clutch, including: an axis of rotation; a hub; an outer ring located radially outwardly of the hub; a plurality of circumferentially aligned wedge plate segments radially disposed between the hub and the outer ring; a cage; and a dual function spring including a first plurality of resilient elements urging the cage in a first axial direction and a second plurality of resilient elements urging the plurality of circumferentially aligned wedge plate segments radially inwardly. For a disconnect mode for the wedge plate clutch, the hub and the outer ring are rotatable with respect to each other. To transition from the disconnect mode to a connect mode for the wedge plate clutch, in which the hub and the outer ring are non-rotatably connected, the cage is arranged to displace the first plurality of circumferentially aligned wedge plate segments.

20 Claims, 13 Drawing Sheets

WEDGE PLATE CLUTCH WITH DUAL FUNCTION SPRING

TECHNICAL FIELD

The present disclosure relates to a wedge plate clutch with a dual function spring. The dual function spring urges wedge plate segments for the wedge plate clutch in a radial direction. A cage is displaced in a first axial direction to transition the wedge plate clutch from an disconnect mode to a connect mode, and the dual function spring displaces the cage in a second axial direction to transition from the connect mode to the disconnect mode. The dual function spring also serves to circumferentially separate the wedge plate segments.

BACKGROUND

It is known for a wedge plate clutch to include: a hub; a plurality of wedge plate segments with respective ramps; an outer ring with a plurality of ramps engaged with the ramps of the wedge plate segments; and a cage. The cage is displaceable in a first axial direction to displace the wedge plate segments into contact with the outer ring to transition the wedge plate clutch from a disconnect mode to a connect mode. Once the connect mode is attained, a spring is used to displace the cage in a second axial direction to separate the cage from the wedge plate segments. A device, separate from the spring is used to control radially outward movement of the wedge plate segments to prevent unintentional contact of the wedge plate segments with the outer ring during the disconnect mode and subsequent unintentional transition to the connect mode for the wedge plate clutch.

SUMMARY

According to aspects illustrated herein, there is provided a wedge plate clutch, including: an axis of rotation; a hub; an outer ring located radially outwardly of the hub; a plurality of circumferentially aligned wedge plate segments radially disposed between the hub and the outer ring; a cage; and a dual function spring including a first plurality of resilient elements urging the cage in a first axial direction and a second plurality of resilient elements urging the plurality of circumferentially aligned wedge plate segments in a first radial direction. For a disconnect mode for the wedge plate clutch, the hub and the outer ring are rotatable with respect to each other. To transition from the disconnect mode to a connect mode for the wedge plate clutch, in which the hub and the outer ring are non-rotatably connected, the cage is arranged to displace the first plurality of circumferentially aligned wedge plate segments.

According to aspects illustrated herein, there is provided a wedge plate clutch, including: an axis of rotation; a hub; an outer ring located radially outward of the hub; a plurality of circumferentially aligned wedge plate segments radially disposed between the hub and the outer ring; a cage; and a dual function spring axially disposed between the cage and the plurality of circumferentially aligned wedge plate segments. The dual function spring includes: an annular body portion; a first plurality of resilient elements extending from the body portion and urging the cage in a first axial direction; and a second plurality of resilient elements extending from the body portion, engaged with the plurality of circumferentially aligned wedge plate segments, and urging the plurality of circumferentially aligned wedge plate segments in a first radial direction. For a disconnect mode for the wedge plate clutch, the hub and the outer ring are rotatable with respect to each other. To transition from the disconnect mode to a connect mode for the wedge plate clutch, in which the hub and the outer ring are non-rotatably connected, the second plurality of resilient elements is arranged to displace the plurality of circumferentially aligned wedge plate segments in the first radial direction. To transition from the connect mode to the disconnect mode, the cage is arranged to displace in a second axial direction, opposite the first axial direction, to displace the plurality of circumferentially aligned wedge plate segments in a second radial direction, opposite the first radial direction.

According to aspects illustrated herein, there is provided a wedge plate clutch, including: an axis of rotation; a hub; an outer ring located radially outwardly of the hub; a plurality of circumferentially aligned wedge plate segments radially disposed between the hub and the outer ring; a cage; and a dual function spring. The dual function spring includes: an annular body portion; a first plurality of resilient elements extending from the body portion and urging the cage in a first axial direction with respect to the plurality of circumferentially aligned wedge plate segments; a second plurality of resilient elements extending from the body portion, in contact with the plurality of circumferentially aligned wedge plate segments; and displacing the plurality of circumferentially aligned wedge plate segments into contact with the hub; and a plurality of protrusions. Each protrusion in the plurality of protrusions circumferentially is disposed between first and second circumferentially adjacent wedge plate segments included in the plurality of circumferentially aligned wedge plate segments. For a connect mode for the wedge plate clutch, the hub and the outer ring are non-rotatably connected. To transition from the connect mode to a disconnect mode for the wedge plate clutch, in which the hub and the outer ring are rotatable with respect to each other, the second plurality of resilient elements is arranged to displace the plurality of circumferentially aligned wedge plate segments in a radial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 13:
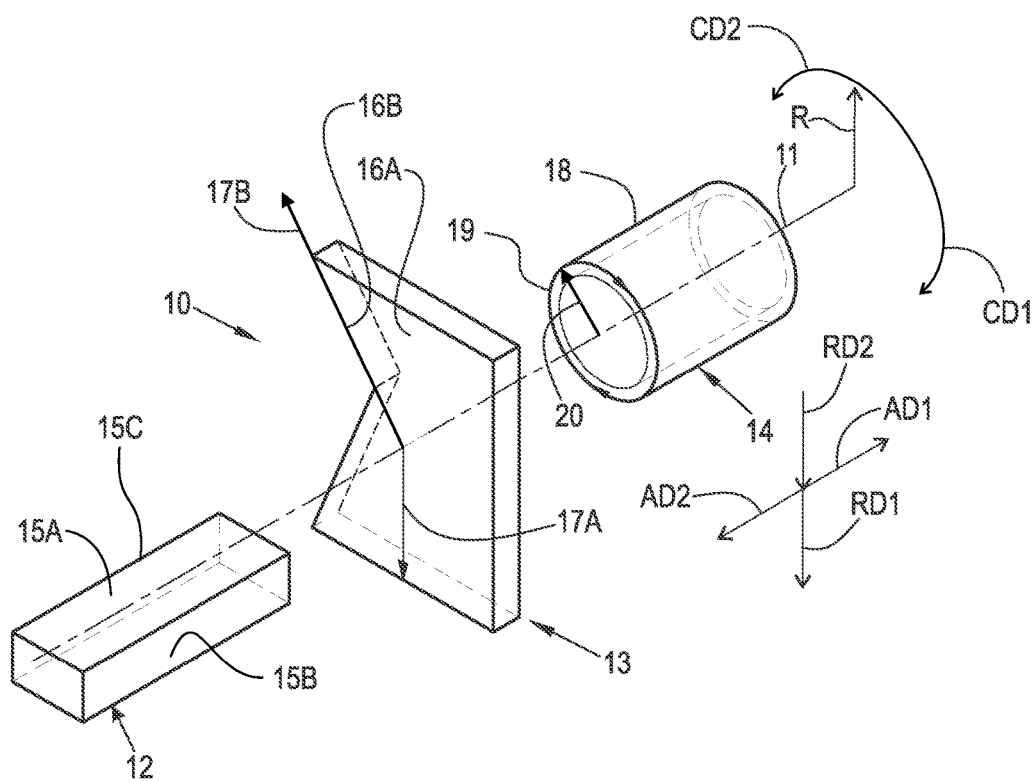
FIG. 13 is a perspective view of a cylindrical coordinate system demonstrating spatial terminology used in the present application.

FIG. 13 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
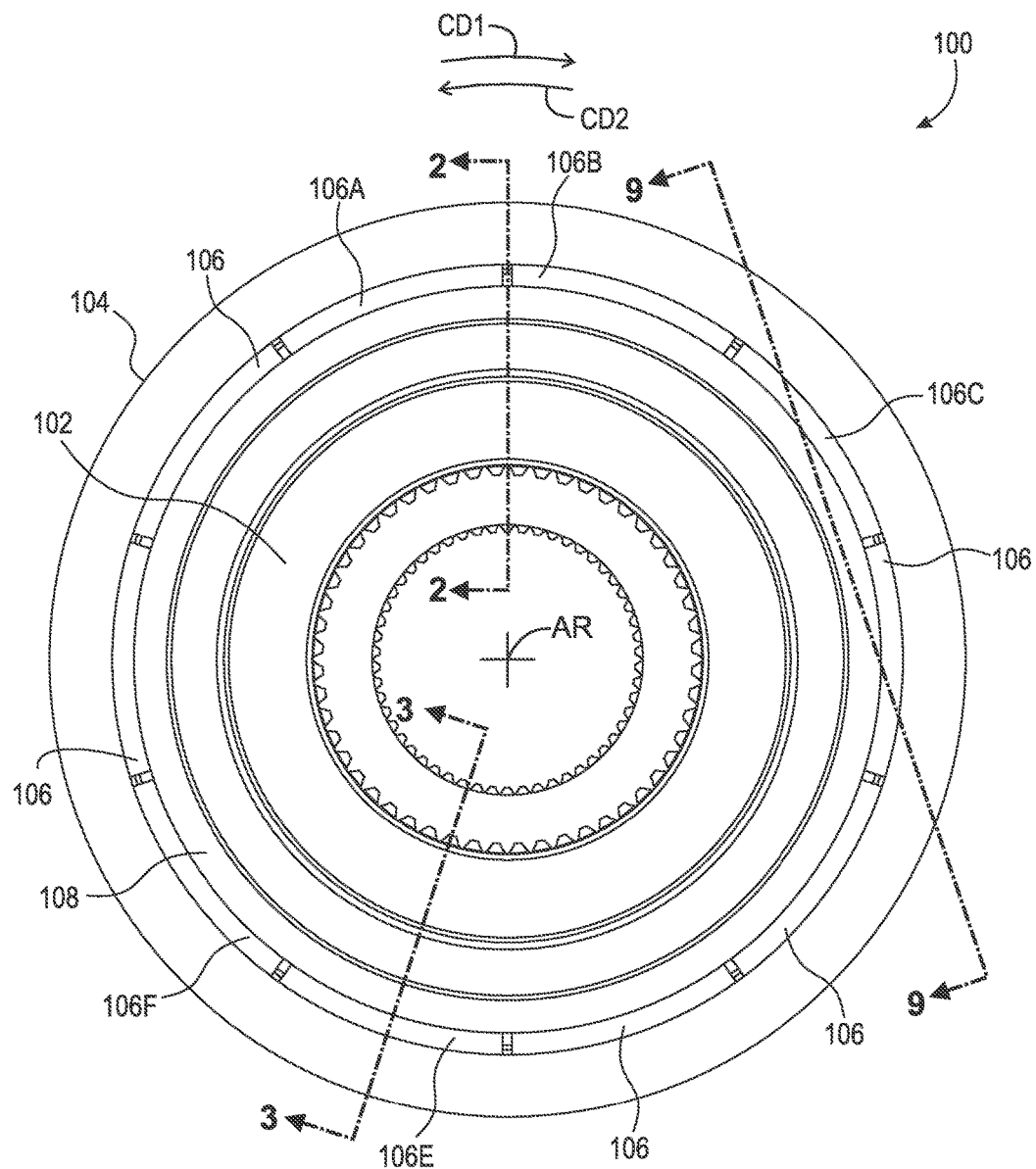
FIG. 1 is a front view of a wedge plate clutch with a dual function spring in an disconnect mode.

FIG. 1 is a front view of example wedge plate clutch 100 with a dual function spring.

Figure 2:
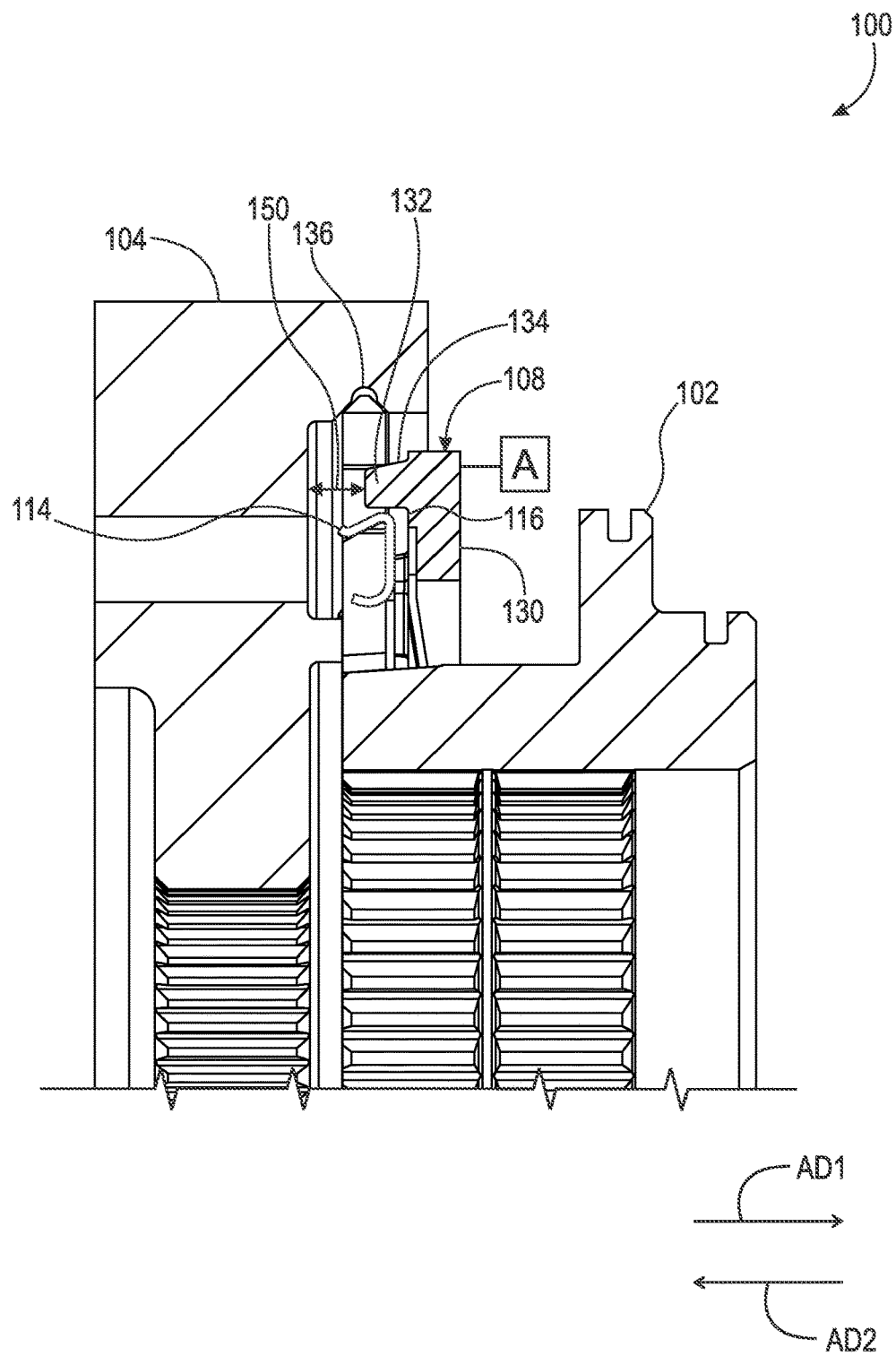
FIG. 2 is a cross-sectional view generally along line 2-2 in FIG. 1.

FIG. 2 is a cross-sectional view generally along line 2-2 in FIG. 1.

Figure 3:
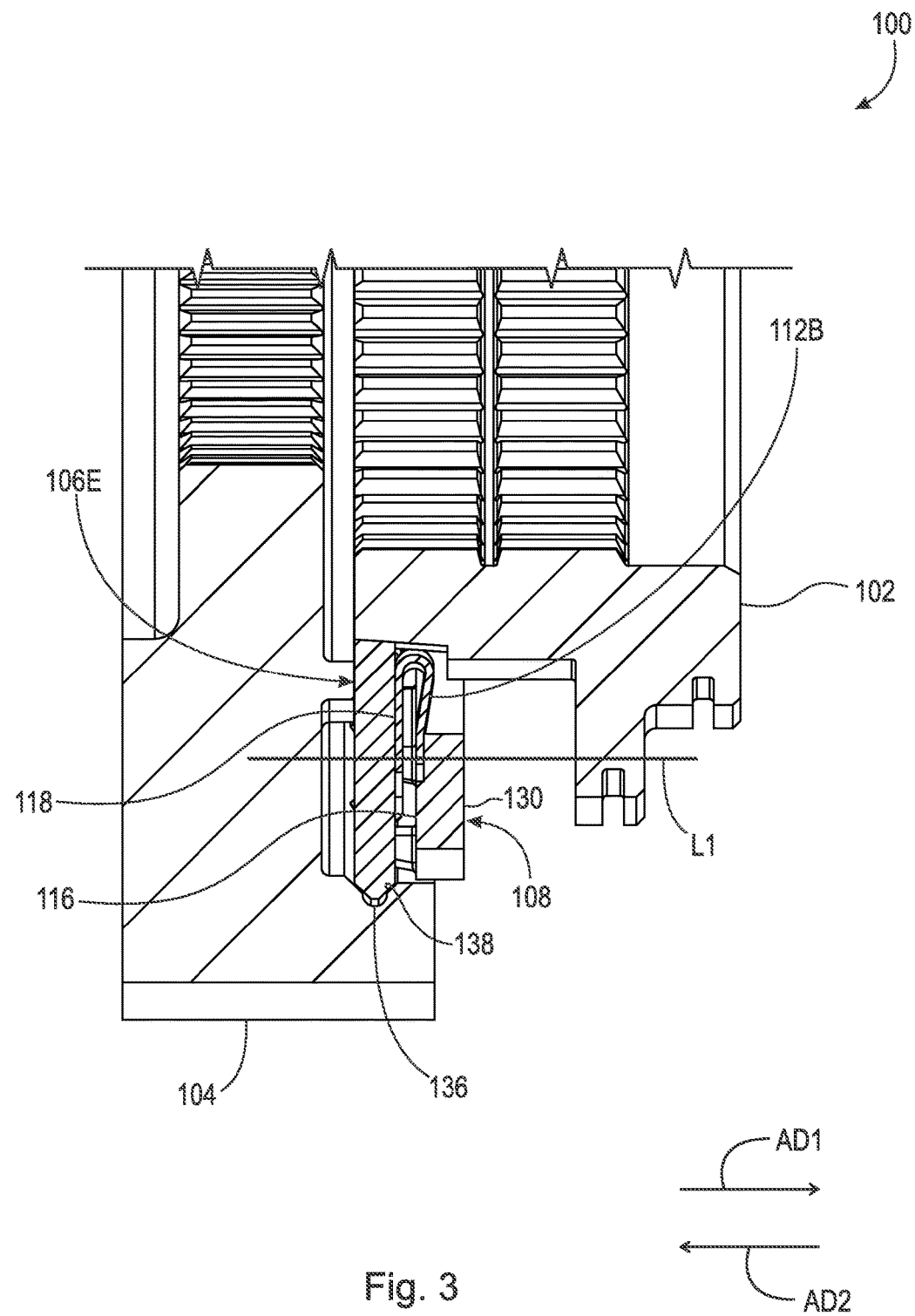
FIG. 3 is a cross-sectional view generally along line 3-3 in FIG. 1.

FIG. 3 is a cross-sectional view generally along line 3-3 in FIG. 1.

Figure 4:
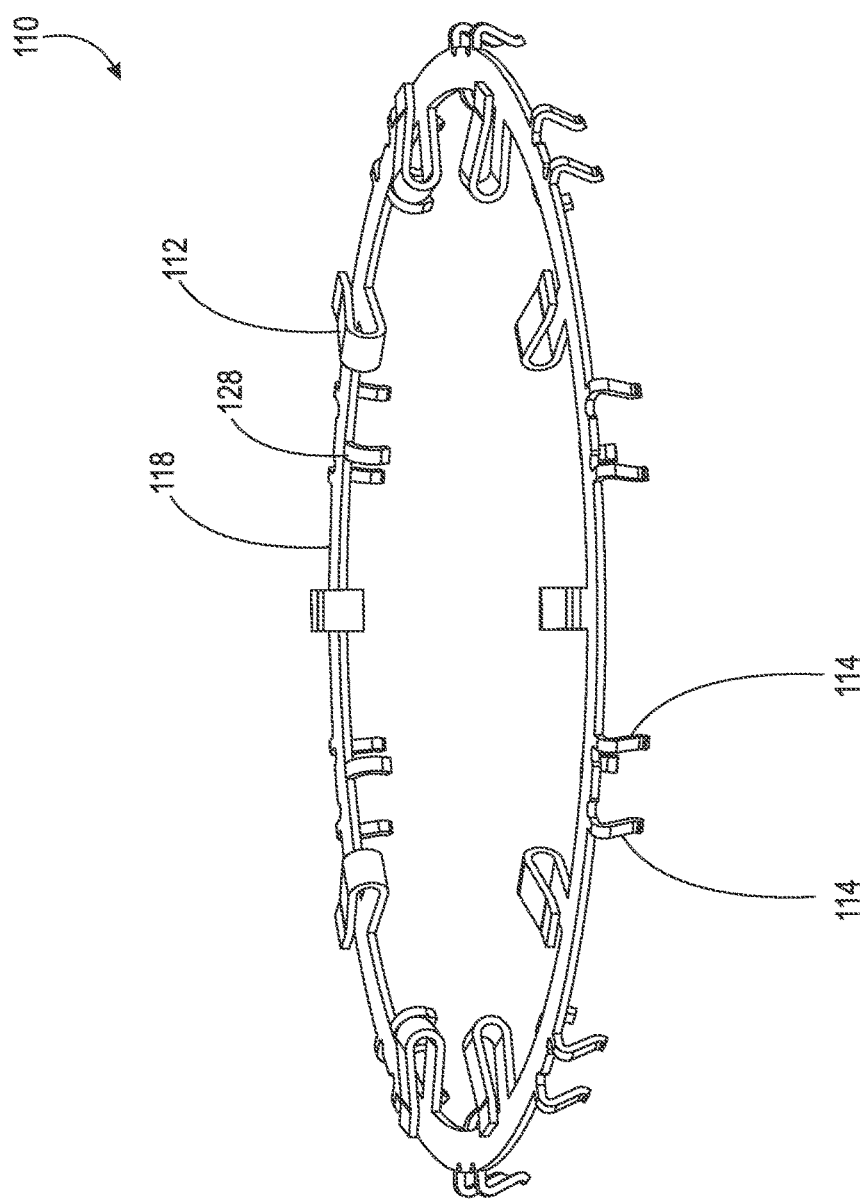
FIG. 4 is a perspective front view of a dual function spring in FIG. 1.

FIG. 4 is a perspective front view of a dual function spring in FIG. 1.

Figure 5:
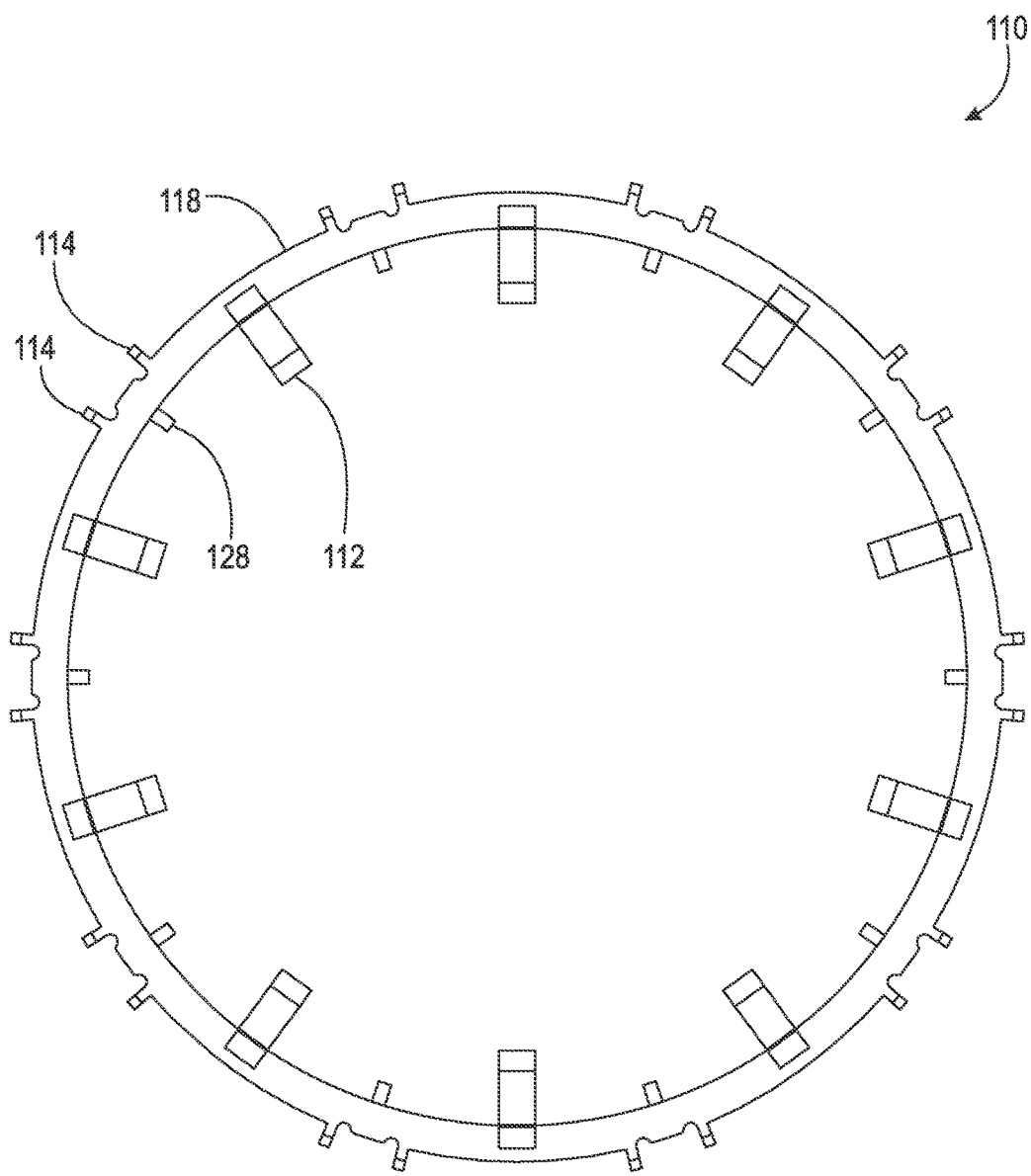
FIG. 5 is a front view of the dual function spring in FIG. 4.

FIG. 5 is a front view of dual function spring 110 in FIG. 4. The following should be viewed in light of FIGS. 1 through 5. Wedge plate clutch 100 includes: axis of rotation AR; hub 102; outer ring 104 located radially outwardly of hub 102; circumferentially aligned wedge plate segments 106 radially disposed between hub 102 and outer ring 104; cage 108; and dual function spring 110.

Spring 110 includes: resilient elements 112 urging cage 108 in a axial direction AD1; and resilient elements 114. Elements 114: are engaged with, for example in contact with, wedge plate segments 106; and urge wedge plate segments 106 in a radial direction, for example, radially inward direction RD. For a disconnect mode for wedge plate clutch 100, hub 102 and outer ring 104 are rotatable with respect to each other. To transition from the disconnect mode to a connect mode for wedge plate clutch 100, in which hub 102 and outer ring 104 are non-rotatably connected via segments 106, cage 108 is arranged to displace wedge plate segments 106 as further described below. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

In the connect mode: clutch 100 transmits rotation torque, applied to hub 102, to ring 104; or clutch 100 transmits rotational torque, applied to ring 104, to hub 102. Thus, it should be understood that: relative rotation of hub 102, with respect to outer ring 104, in direction CD1 can be caused by application of rotational torque to hub 102 in direction CD1 or by application of rotational torque on outer ring 104 in direction CD2; and relative rotation of hub 102, with respect to outer ring 104, in direction CD2 can be caused by application of rotational torque to hub 102 in direction CD2 or by application of rotational torque on outer ring 104 in direction CD1.

Cage 108 includes surface 116 facing axial direction AD2, opposite axial direction AD1. Dual function spring 110, in particular, elements 112, is in contact with surface 116. Dual function spring 110 includes annular body portion 118, axially disposed between cage 108 and wedge plate segments 106. In an example embodiment, body portion 118 is in contact with segments 106. Elements 112 extend from annular body portion 118 in axial direction AD1. Elements 114 extend from annular body portion 118 in axial direction AD2, opposite direction AD1. In an example embodiment: elements 112 extend radially inwardly from portion 118 and elements 114 extend radially outwardly from portion 118.

Figure 6:
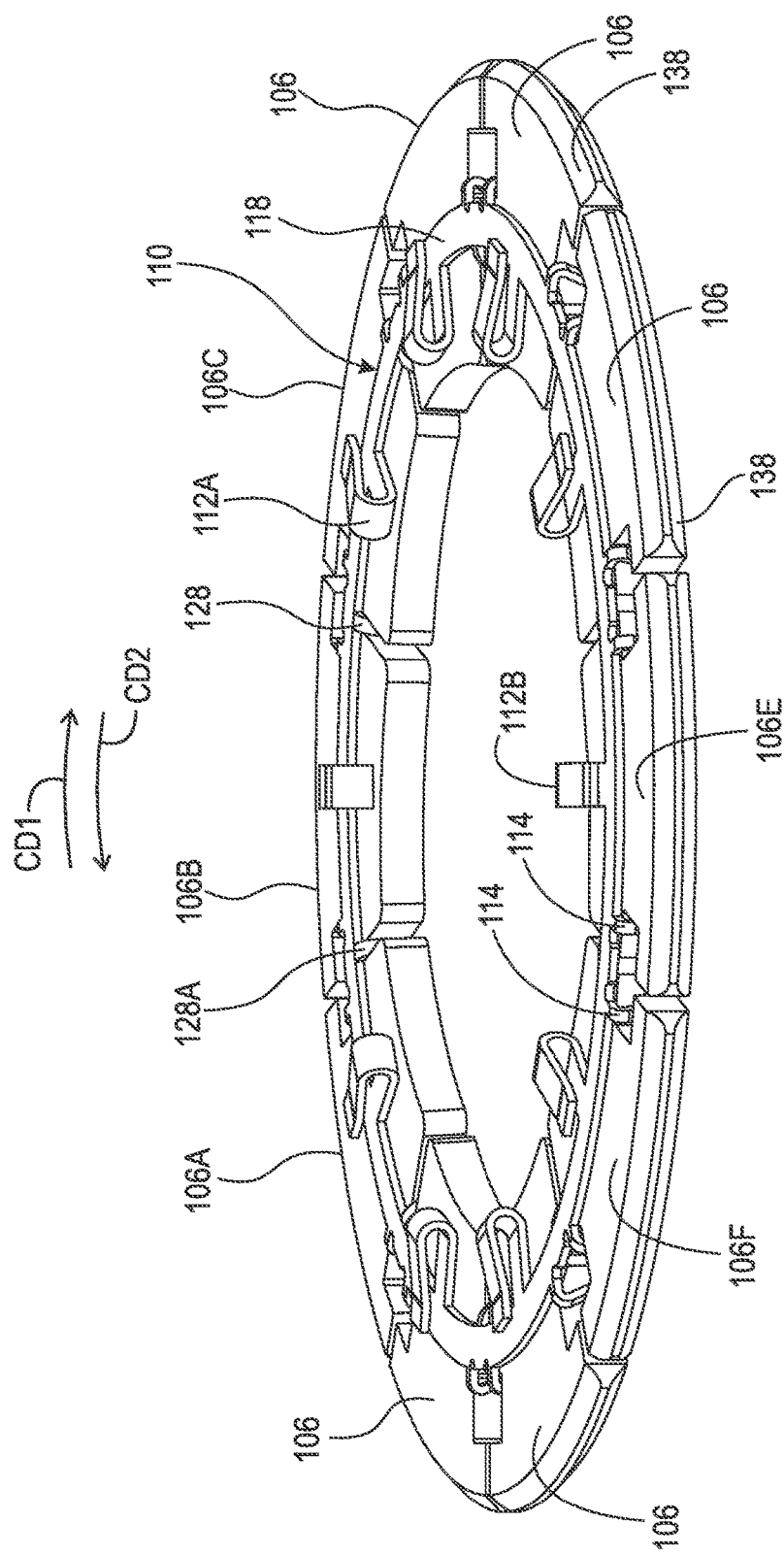
FIG. 6 is a perspective back view of circumferentially aligned wedge plate segments and the dual function spring in FIG. 1.

FIG. 6 is a perspective back view of circumferentially aligned wedge plate segments 106 and dual function spring 110 in FIG. 1.

Figure 7:
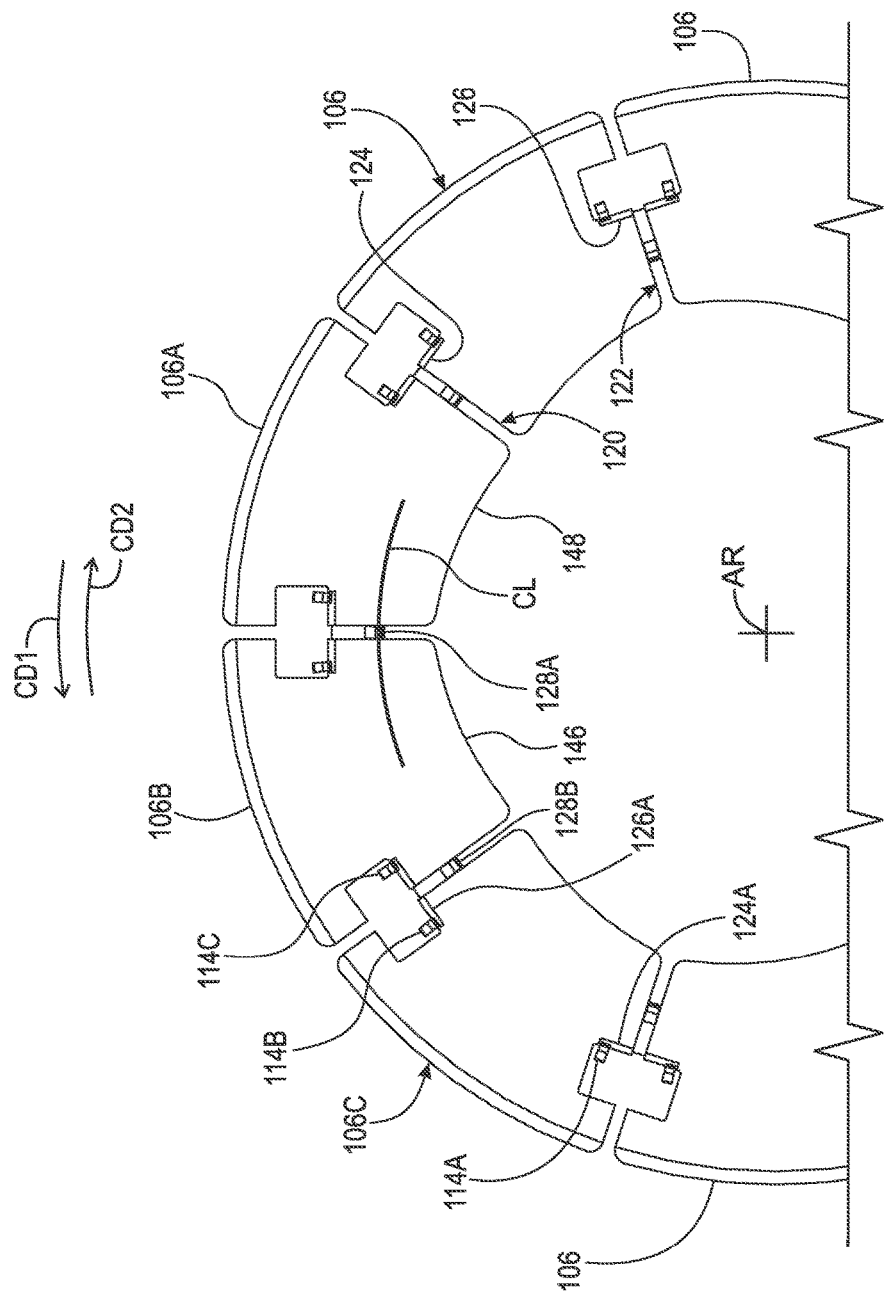
FIG. 7 is a partial back view of the circumferentially aligned wedge plate segments and the dual function spring in FIG. 1.

FIG. 7 is a partial back view of circumferentially aligned wedge plate segments 106 and dual function spring 110 in FIG. 1. The following should be viewed in light of FIGS. 1 through 7. Each wedge plate segment 106 includes circumferential ends 120 and 122 facing in circumferential directions CD1 and CD2, respectively. In an example embodiment, ends 120 and 122 include shoulders 124 and 126, respectively. Resilient elements 114 are engaged with, for example are in contact with, shoulders 124 and 126. For example, elements 114A and 114B are in contact with shoulders 124A and 126A for wedge plate segment 106C.

In general, a reference character "[digit][digit][digit][letter]" designates a specific example of an element labeled as "[digit][digit][digit]." For example, resilient element 114A is a specific example from resilient elements 114.

In an example embodiment: two resilient elements 114 are in contact with each wedge plate segment 106; and a resilient element 112 is circumferentially disposed between the two resilient elements 114. For example, segment 112A is circumferentially disposed between elements 114A and 114B.

In an example embodiment, dual function spring 110 includes protrusions 128 circumferentially interleaved with wedge plate segments 106. Each protrusion 128 is circumferentially disposed between two respective wedge plate segments 106 and circumferentially separates the two wedge plate segments 106. In the disconnect mode, each protrusion is in contact with the two respective wedge plate segments 106. Thus, protrusions 128 maintain respective circumferential positions of wedge plate segments 106. For example, protrusion 128A is circumferentially disposed between wedge plate segments 106A and 106B. A circumferential line passes through in sequence: a first wedge plate segment 106; a protrusion 128; and a second wedge plate segment 106. For example, circumferential line CL in direction CD1, passes through in sequence: wedge plate segment 106A; protrusion 128A; and wedge plate segment 106B. In an example embodiment, each protrusion 128 is circumferentially disposed between two respective resilient elements 114. For example, protrusion 128B is circumferentially disposed between segments 106B and 106C.

Line L1, parallel to axis AR, passes through, in sequence: a wedge plate segment 106, for example segment 106D; a resilient element 112, for example element 112B; and cage 108.

Figure 8:
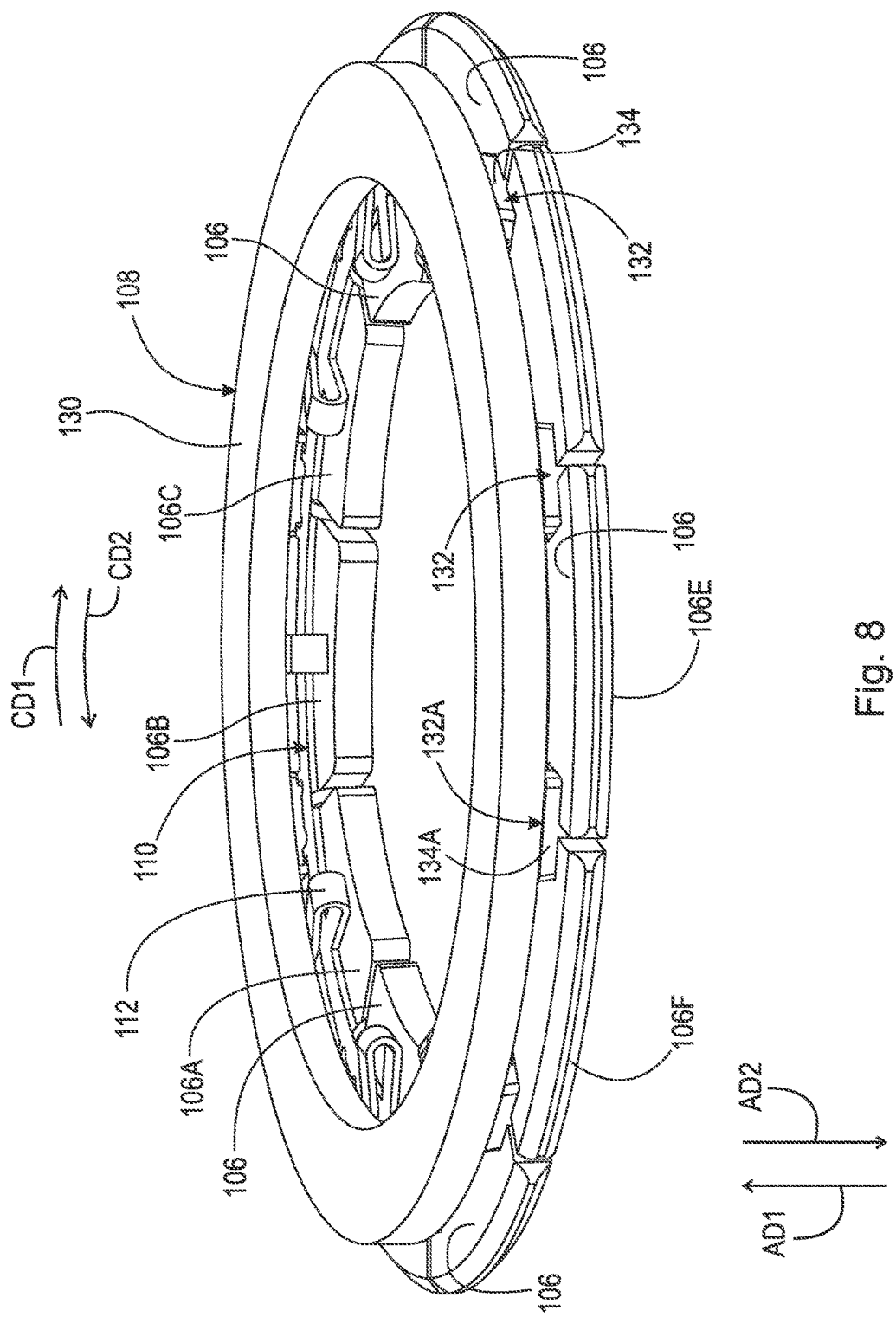
FIG. 8 is a perspective front view of a cage, the circumferentially aligned wedge plate segments and the dual function spring in FIG. 1.

FIG. 8 is a perspective front view of cage 108, circumferentially aligned wedge plate segments 106, and dual function spring 110 in FIG. 1.

Figure 9:
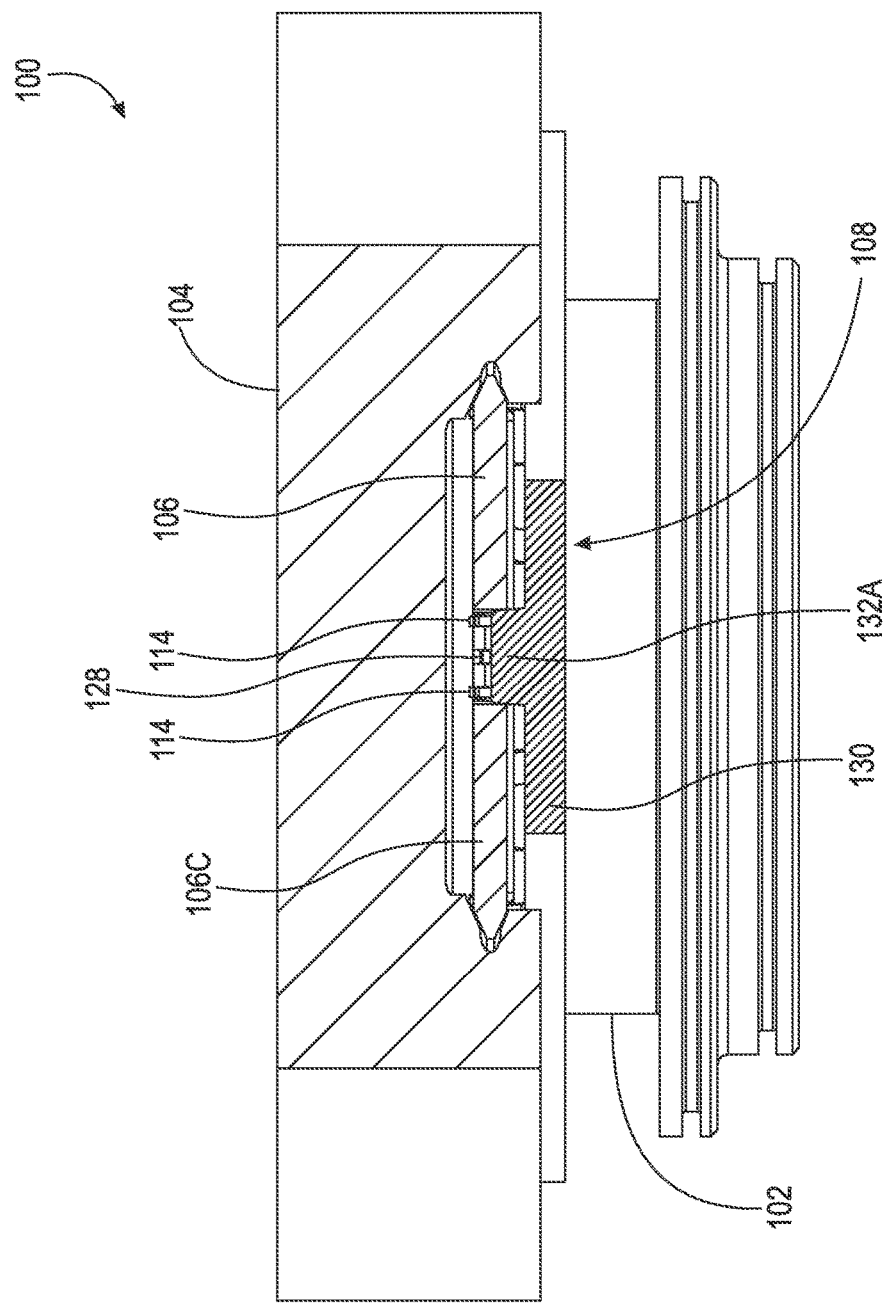
FIG. 9 is a cross-sectional view generally along line 9-9 in FIG. 1.

FIG. 9 is a cross-sectional view generally along line 9-9 in FIG. 1. The following should be viewed in light of FIGS. 1 through 9. In an example embodiment, cage 108 includes annular body portion 130 and activation protrusions 132 extending from annular body portion 130 in axial direction AD2. Each activation protrusion 132 is disposed between two respective circumferentially adjacent wedge plate segments 106. For example, protrusion 132A is disposed between circumferentially adjacent wedge plate segments 106D and 106E. Each protrusion 132 includes at least one surface 134. Each surface 134 is in contact with the two respective circumferentially adjacent wedge plate segments 106 and slopes radially outwardly in axial direction AD2, as best seen in FIG. 2. For example, surface 134A of protrusion 132A is in contact with segments 106D and 106E. In the example of FIGS. 1-9, surfaces 134 are in contact with segments 106 in the disconnect mode. In an example embodiment (not shown), surfaces 134 are not in contact with segments 106 in the disconnect mode.

The following provides further detail regarding the structure and function of clutch 100 and dual function spring 110. In an example embodiment: outer ring 104 includes circumferentially disposed groove 136; and each wedge plate segment 106 includes chamfered surfaces 138 forming at least a portion of a radially outer surface of the wedge plate segment 106. Chamfers 138 are disposed in circumferentially disposed groove 136.

Figure 10:
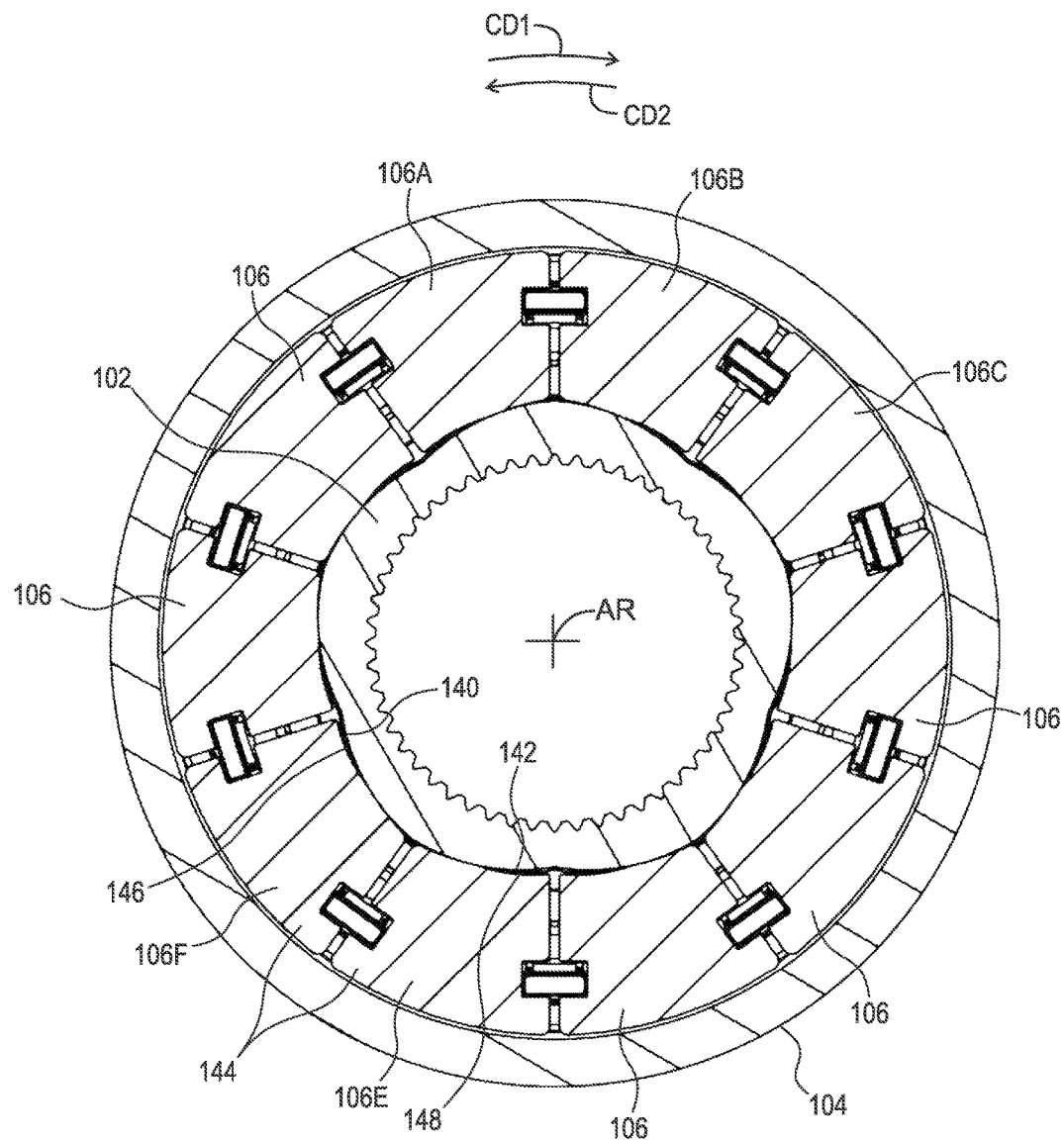
FIG. 10 is a front cut-away view through a hub, the circumferentially aligned wedge plate segments, the dual function spring, and an outer ring of the wedge plate clutch in FIG. 1.

FIG. 10 is a front cut-away view through hub 102, circumferentially aligned wedge plate segments 106, spring 110, and outer ring 104 of wedge plate clutch 100 in FIG. 1. The following should be viewed in light of FIGS. 1 through 10. Hub 102 includes ramps 140 and ramps 142 forming at least a portion of a radially outer surface for hub 102. Ramps 140 slope radially inwardly in circumferential direction CD1 and ramps 142 slope radially inwardly in circumferential direction CD2, opposite direction CD1. Segments 106 are grouped in respective pairs 144. For example, segments 106D and 106E form a pair 144. For each pair 144: one of the segments 106, for example segment 106E, includes ramp 146 sloping radially inwardly in direction CD1; and the other of the segments 106, for example segment 106D, includes ramp 148 sloping radially inwardly in direction CD2. Ramps 146 and 148 form at least a portion of the radial inner surfaces for respective segments 106 in the pair 144. Ramps 140 and 146 are in contact. Ramps 142 and 148 are in contact.

Figure 11:
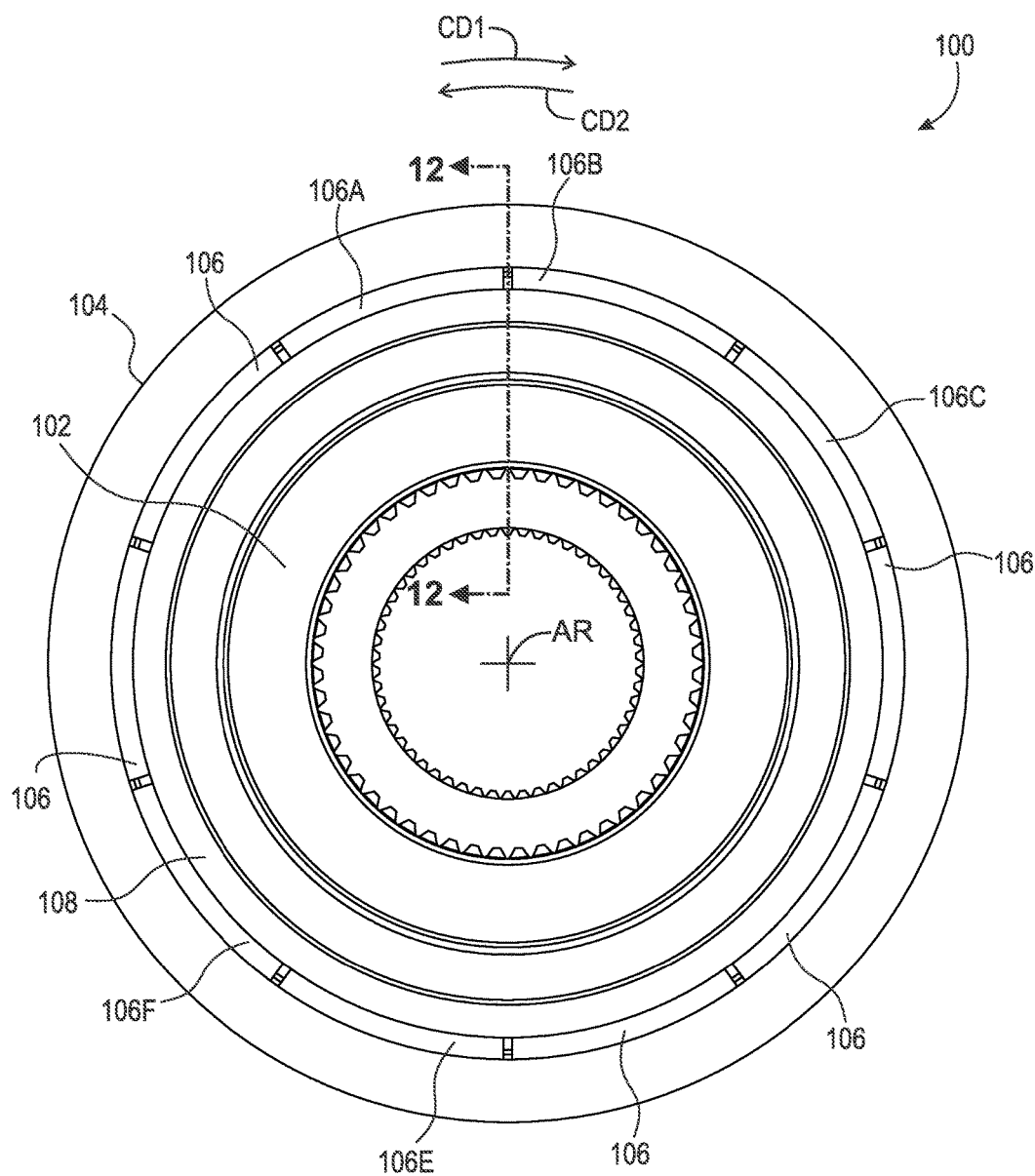
FIG. 11 is a front view of the wedge plate clutch in FIG. 1 in a connect mode.

FIG. 11 is a front view of wedge plate clutch 100 in FIG. 1 in the connect mode.

Figure 12:
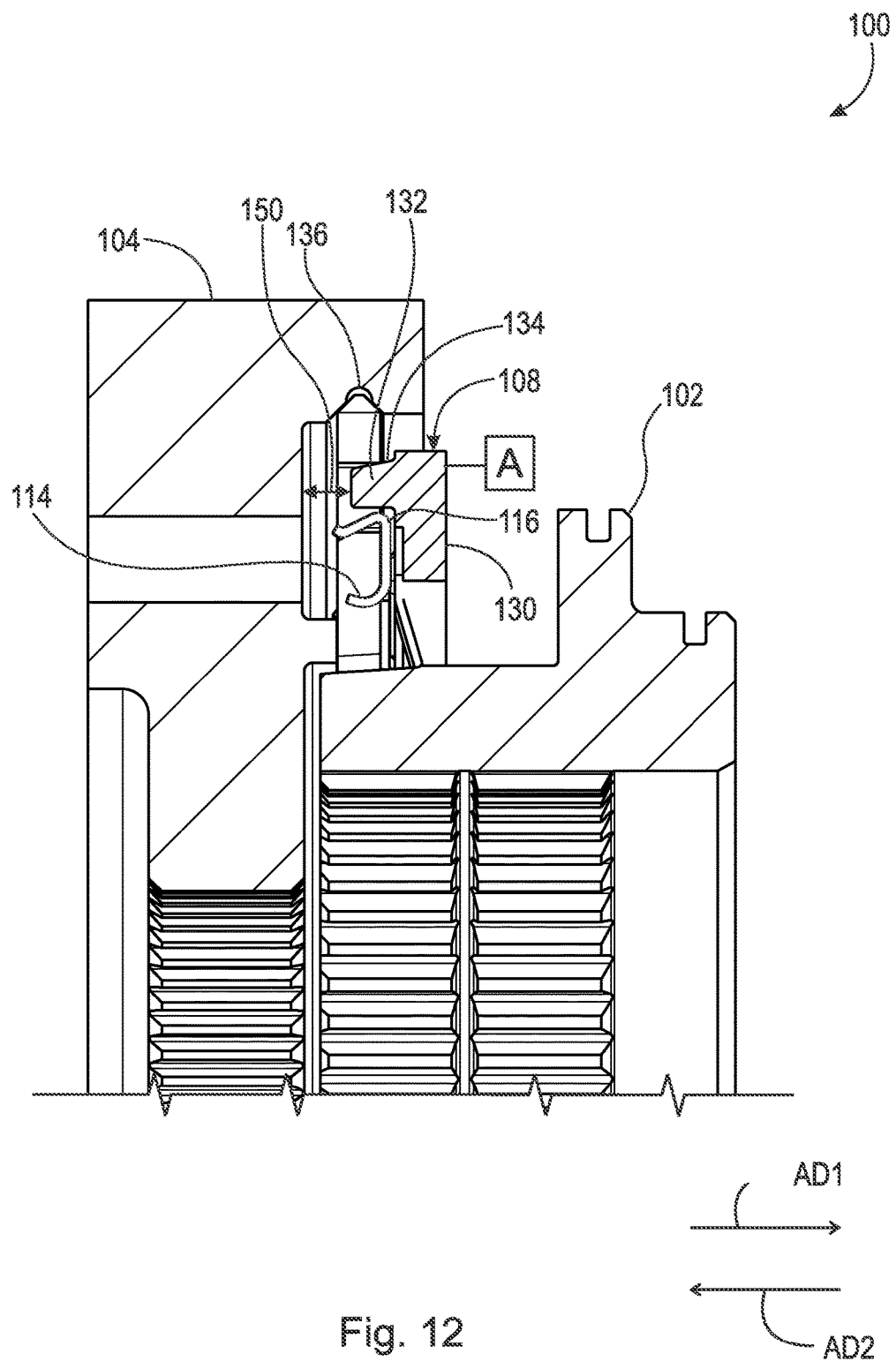
FIG. 12 is a cross-sectional view generally along line 12-12 in FIG. 11.

FIG. 12 is a cross-sectional view generally along line 12-12 in FIG. 11. The following should be viewed in light of FIGS. 1 through 12. In the disconnect mode: elements 114 displace segments 106 radially inwardly into contact with hub 102; and segments 106 and hub 102 are rotatable with respect to outer ring 104.

To transition from the disconnect mode to the connect mode for relative rotation of hub 102, with respect to outer ring 104, in direction CD1: actuator A displaces cage 108 and protrusions 132 in axial direction AD1. Surfaces 134 displace segments 106 radially outwardly. Segments 106 with ramps 146: frictionally engage outer ring 104 or increase existing frictional engagement with outer ring 104; and rotate with outer ring 104 and with respect to hub 102 in direction CD1, to slide ramps 146 radially outwardly along ramps 140. Sliding ramps 146 along ramps 140 compressively engages the segments 106 between hub 102 and outer ring 104 and non-rotatably connects the segments 106 with hub 102 and outer ring 104. By components "compressively engaged between" two elements, we mean that: one element, for example hub 102, exerts a normal force on the component, for example, segments 106; and the other element, for example, ring 104, exerts a normal force on the component. Thus, the two element squeeze the component between them. Actuator A can be any actuator known in the art.

Ramps 148 slide radially inwardly along ramps 142, decreasing or eliminating frictional contact between ring 104 and segments 106 with ramps 148. Once in the connect mode, hub 102 and ring 104 rotate together in direction CD1. As further described below, as long as cage 108 remains displaced in direction AD1 and urges segments 106 radially outwardly, clutch 100 remains in the connect mode regardless of the direction of torque applied to clutch 100 or a direction of rotation of hub 102 and ring 104.

To transition from the connect mode to the disconnect mode for rotation of hub 102 and ring 104 in direction CD1: cage 108 is displaced in direction AD2; rotational torque is removed from clutch 100 or rotational torque on clutch 100 is reversed; and elements 112 displace cage 108 in direction AD2. For segments 106 with ramps 146: elements 114 displace ramps 146 radially inwardly and circumferentially along ramps 140, decreasing or eliminating frictional contact between those segments 106 with ramps 146 and ring 104.

To transition from the disconnect mode to the connect mode for relative rotation of hub 102, with respect to outer ring 104, in direction CD2: actuator A displaces cage 108 and protrusions 132 in axial direction AD1. Surfaces 134 displace segments 106 radially outwardly. Segments 106 with ramps 148: frictionally engage outer ring 104 or increase existing frictional engagement with outer ring 104; and rotate with outer ring 104 and with respect to hub 102 in direction CD2 to slide ramps 148 radially outwardly along ramps 142. Sliding ramps 148 along ramps 142 compressively engages the segments 106 between hub 102 and outer ring 104 and non-rotatably connects the segments 106 with hub 102 and outer ring 104.

Ramps 146 slide radially inwardly along ramps 140, decreasing or eliminating frictional contact between ring 104 and segments 106 with ramps 146. Once in the connect mode, hub 102 and ring 104 rotate together in direction CD2. As further described below, as long as cage 108 remains displaced in direction AD1 and urges segments 106 radially outwardly, clutch 100 remains in the connect mode regardless of the direction of torque applied to clutch 100 or a direction of rotation of hub 102 and ring 104.

To transition from the connect mode to the disconnect mode for rotation of hub 102 and ring 104 in direction CD2: cage 108 is displaced in direction AD2; rotational torque is removed from clutch 100 or rotational torque on clutch 100 is reversed; and elements 112 displace cage 108 in direction AD2. For segments 106 with ramps 148: elements 114 displace ramps 148 radially inwardly and circumferentially along ramps 142, decreasing or eliminating frictional contact between those segments 106 with ramps 148 and ring 104.

As noted above, as long as cage 108 remains displaced in direction AD1 and urges segments 106 radially outwardly, clutch 100 remains in the connect mode regardless of the direction of torque applied to clutch 100 or a direction of rotation of hub 102 and ring 104. For example, assume clutch 100 is in a drive train of a vehicle, hub 102 is rotated in direction CD1 by an engine for the vehicle, and clutch 100 is in the connect mode. When the engine accelerates, torque is applied to hub 102 in direction CD1, causing segments 106 with ramps 146 to be compressively engaged between hub 102 and ring 104 as noted above.

When the vehicle decelerates or enters a coast mode, torque is applied to outer ring 104 in direction CD2, while hub 102 and outer ring 104 continue to rotate in direction CD1, causing segments 106 with ramps 148 to be compressively engaged between hub 102 and ring 104 as noted above. Thus, in both the acceleration and coast modes and in transition between the acceleration and coast modes, clutch 100 remains in the connect mode. Further, in like manner, when clutch 100 is downstream of a transmission, clutch 100 remains in the connect mode when the direction of rotation of hub 102 and ring 104 is reversed. The above example discussion applies to rotation of hub 102 in direction CD2 by an engine.

Thus, to transition from the disconnect mode to the connect mode, axial distance 150, between outer ring 104 and activation protrusions 132, is larger in the disconnect mode (as seen in FIG. 2), than in the connect mode (as seen in FIG. 12).

Dual function spring 100 combines the function of displacing cage 108 in axial direction AD2, with elements 112, to enable transition from the connect mode to the disconnect mode and the function of controlling radially outward displacement of segments 106, with elements 114, to prevent unintentional contact of segments 106 with outer ring 104 during the disconnect mode and a subsequent unintentional transition from the disconnect mode to the connect mode. Further protrusions 128 circumferentially separate respective adjacent pairs of segments 106, preventing jamming of segments 106 in transitions between the connect and disconnect modes.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
100 wedge plate clutch
102 hub
104 outer ring
106 wedge plate segment
106A wedge plate segment
106B wedge plate segment
106C wedge plate segment
106D wedge plate segment
106E wedge plate segment
108 cage
110 dual function spring
112 resilient element
114 resilient element
114A resilient element
114B resilient element
114C resilient element
116 surface, cage 108
118 annular body portion, cage 108
120 circumferential end, segment 106
122 circumferential end, segment 106
124 shoulder, segment 106
124A shoulder, segment 106
126 shoulder, segment 106
126A shoulder, segment 106

128 protrusions, spring 110
128A protrusions, spring 110
130 annular body portion, cage 108
132 activation protrusion, cage 108
132A activation protrusion, cage 108
134 surface, protrusion 132
134A surface, protrusion 132
136 groove, ring 104
138 chamfered surface, segment 106
140 ramp, hub 102
142 ramp, hub 102
144 pair of segments 106
146 ramp, segment 106
148 ramp, segment 106
150 axial distance

The invention claimed is:

1. A wedge plate clutch, comprising:
an axis of rotation;
a hub;
an outer ring located radially outwardly of the hub;
a first plurality of circumferentially aligned wedge plate segments radially disposed between the hub and the outer ring;
a cage; and,
a dual function spring including:
a first plurality of resilient elements urging the cage in a first axial direction; and,
a second plurality of resilient elements integral with the first plurality of resilient elements and urging the first plurality of circumferentially aligned wedge plate segments in a first radial direction, wherein:
for a disconnect mode for the wedge plate clutch, the hub and the outer ring are rotatable with respect to each other; and,
to transition from the disconnect mode to a connect mode for the wedge plate clutch, in which the hub and the outer ring are non-rotatably connected, the cage is arranged to displace the first plurality of circumferentially aligned wedge plate segments.

2. The wedge plate clutch of claim 1, wherein to transition from the connect mode to the disconnect mode, the second plurality of resilient elements displaces the first plurality of circumferentially aligned wedge plate segments in the first radial direction.

3. The wedge plate clutch of claim 1, wherein to transition from the disconnect mode to the connect mode, the cage is arranged to displace the first plurality of circumferentially aligned wedge plate segments in a second radial direction, opposite the first radial direction.

4. The wedge plate clutch of claim 1, wherein:
the dual function spring includes a plurality of protrusions circumferentially interleaved with the first plurality of circumferentially aligned wedge plate segments; and,
a circumferential line passes through in sequence: a first wedge plate segment included in the first plurality of circumferentially aligned wedge plate segments; a protrusion included in the plurality of protrusions; and a second wedge plate segment included in the first plurality of circumferentially aligned wedge plate segments.

5. The wedge plate clutch of claim 4, wherein each protrusion included in the plurality of protrusions is circumferentially disposed between:
a respective first resilient element included in the second plurality of resilient elements; and,
a respective second resilient element included in the second plurality of resilient elements.

6. The wedge plate clutch of claim 4, wherein:
the dual function spring includes an annular body portion axially disposed between the cage and the first plurality of circumferentially aligned wedge plate segments;
the first plurality of resilient elements extends from the annular body portion;
the second plurality of resilient elements extends from the annular body portion; and,
the plurality of protrusions extends from the annular body portion.

7. The wedge plate clutch of claim 1, wherein:
the dual function spring includes a plurality of protrusions; and,
each protrusion included in the plurality of protrusions is:
circumferentially disposed between:
a respective first wedge plate segment included in the first plurality of circumferentially aligned wedge plate segments; and,
a respective second wedge plate segment included in the first plurality of circumferentially aligned wedge plate segments; and,
in the disconnect mode, is in contact with the respective first wedge plate segment and the respective second wedge plate segment.

8. The wedge plate clutch of claim 1, wherein a line, parallel to the axis of rotation, passes through, in sequence: a wedge plate segment included in the first plurality of circumferentially aligned wedge plate segments; a resilient element included in the first plurality of resilient elements; and the cage.

9. The wedge plate clutch of claim 1, wherein:
each circumferentially aligned wedge plate segment included in the first plurality of circumferentially aligned wedge plate segments includes:
a respective first shoulder at a first circumferential end of said each circumferentially aligned wedge plate segment; and,
a respective second shoulder at a second circumferential end of said each circumferentially aligned wedge plate segment; and,
the second plurality of resilient elements is in contact with the respective first shoulders and with the respective second shoulders.

10. The wedge plate clutch of claim 1, wherein the second plurality of resilient elements urges the first plurality of circumferentially aligned wedge plate segments radially inwardly into contact with the hub.

11. The wedge plate clutch of claim 1, wherein a respective first resilient element, included in the second plurality of resilient elements and a respective second resilient element, included in the second plurality of resilient elements, are in contact with each circumferentially aligned wedge plate segment included in the first plurality of circumferentially aligned wedge plate segments.

12. The wedge plate clutch of claim 11, wherein a respective resilient element, included in the first plurality of resilient elements, is circumferentially disposed between the respective first resilient element and the respective second resilient element.

13. The wedge plate clutch of claim 1, wherein:
the dual function spring includes an annular body portion;
the first plurality of resilient elements extends radially inwardly from the annular body portion; and,
the second plurality of resilient elements extends radially outwardly from the annular body portion.

14. The wedge plate clutch of claim 13, wherein:
the first plurality of resilient elements extends past the annular body portion and the second plurality of resilient elements in the first axial direction; and,
the second plurality of resilient elements extends past the annular body portion and the first plurality of resilient elements in a second axial direction, opposite the first axial direction.

15. The wedge plate clutch of claim 1, wherein:
the cage includes:
an annular body portion; and,
a plurality of activation protrusions extending from the annular body portion in a second axial direction, opposite the first axial direction; and,
each activation protrusion included in the plurality of activation protrusions:
is disposed between:
a respective first circumferentially adjacent wedge plate segment included in the first plurality of circumferentially aligned wedge plate segments; and,
a respective second circumferentially adjacent wedge plate segment included in the first plurality of circumferentially aligned wedge plate segments; and,
includes at least one respective surface:
in contact with:
the respective first circumferentially adjacent wedge plate segment; and,
the respective second circumferentially adjacent wedge plate segment; and,
sloping in the first radial direction along the second axial direction.

16. The wedge plate clutch of claim 1, wherein:
the outer ring includes a circumferentially disposed groove;
each circumferentially aligned wedge plate segment included in the first plurality of circumferentially aligned wedge plate segments includes at least one chamfered surface; and,
the at least one chamfered surfaces are disposed in the circumferentially disposed groove.

17. The wedge plate clutch of claim 1, wherein
the hub includes a plurality of first ramps, each first ramp sloping radially inwardly along a first circumferential direction;
the first plurality of circumferentially aligned wedge plate segments includes a second plurality of circumferentially aligned wedge plate segments;
each circumferentially aligned wedge plate segment included in the second plurality of circumferentially aligned wedge plate segments includes a respective second ramp sloping radially inwardly along the first circumferential direction; and,
to initiate the connect mode:
the cage displaces the second plurality of circumferentially aligned wedge plate segments in a second radial direction, opposite the first radial direction;
the respective second ramps slide along the plurality of first ramps in the second radial direction; and,
the hub and the outer ring compressively engage the second plurality of circumferentially aligned wedge plate segments.

18. The wedge plate clutch of claim 17, wherein
the hub includes a plurality of third ramps, each third ramp sloping radially inwardly along a second circumferential direction, opposite the first circumferential direction;
the first plurality of circumferentially aligned wedge plate segments includes a third plurality of circumferentially aligned wedge plate segments;
each circumferentially aligned wedge plate segment included in the third plurality of circumferentially aligned wedge plate segments includes a respective fourth ramp sloping radially inwardly along the second circumferential direction; and,
to initiate the connect mode:
the cage displaces the third plurality of circumferentially aligned wedge plate segments in the second radial direction;
the respective fourth ramps slide along the plurality of third ramps in the second radial direction; and,
the hub and the outer ring compressively engage the third plurality of circumferentially aligned wedge plate segments.

19. A wedge plate clutch, comprising:
an axis of rotation;
a hub;
an outer ring located radially outward of the hub;
a plurality of circumferentially aligned wedge plate segments radially disposed between the hub and the outer ring;
a cage; and,
a dual function spring axially disposed between the cage and the plurality of circumferentially aligned wedge plate segments and including:
an annular body portion;
a first plurality of resilient elements extending from the annular body portion and urging the cage in a first axial direction; and,
a second plurality of resilient elements:
extending from the annular body portion;
engaged with the plurality of circumferentially aligned wedge plate segments; and,
urging the plurality of circumferentially aligned wedge plate segments in a first radial direction, wherein:
for a disconnect mode for the wedge plate clutch, the hub and the outer ring are rotatable with respect to each other;
in a connect mode for the wedge plate clutch, the hub and the outer ring are non-rotatably connected;
to transition from the disconnect mode to the connect mode, the cage is arranged to displace in a second axial direction, opposite the first axial direction, to displace the plurality of circumferentially aligned wedge plate segments in a second radial direction, opposite the first radial direction; and,
to transition from the connect mode to the disconnect mode:
the cage is arranged to displace in the first axial direction; and,
the second plurality of resilient elements is arranged to displace the plurality of circumferentially aligned wedge plate segments in the first radial direction.

20. A wedge plate clutch, comprising:
an axis of rotation;
a hub;
an outer ring located radially outwardly of the hub;
a plurality of circumferentially aligned wedge plate segments radially disposed between the hub and the outer ring;

a cage; and,
a dual function spring including:
  an annular body portion;
  a first plurality of resilient elements extending from the annular body portion and urging the cage in a first axial direction with respect to the plurality of circumferentially aligned wedge plate segments;
  a second plurality of resilient elements:
    extending from the annular body portion; and,
    in contact with the plurality of circumferentially aligned wedge plate segments; and,
  a plurality of protrusions, each protrusion in the plurality of protrusions circumferentially disposed between:
    a respective first circumferentially adjacent wedge plate segment included in the plurality of circumferentially aligned wedge plate segments; and,
    a respective second circumferentially adjacent wedge plate segment included in the plurality of circumferentially aligned wedge plate segments, wherein:
for a connect mode for the wedge plate clutch, the hub and the outer ring are non-rotatably connected; and,
to transition from the connect mode to a disconnect mode for the wedge plate clutch, in which the hub and the outer ring are rotatable with respect to each other, the second plurality of resilient elements is arranged to displace the plurality of circumferentially aligned wedge plate segments in a radial direction.

\* \* \* \* \*